July 11, 1961     P. J. CAROLAN     2,991,583
SEAT PRESS
Filed Dec. 8, 1958
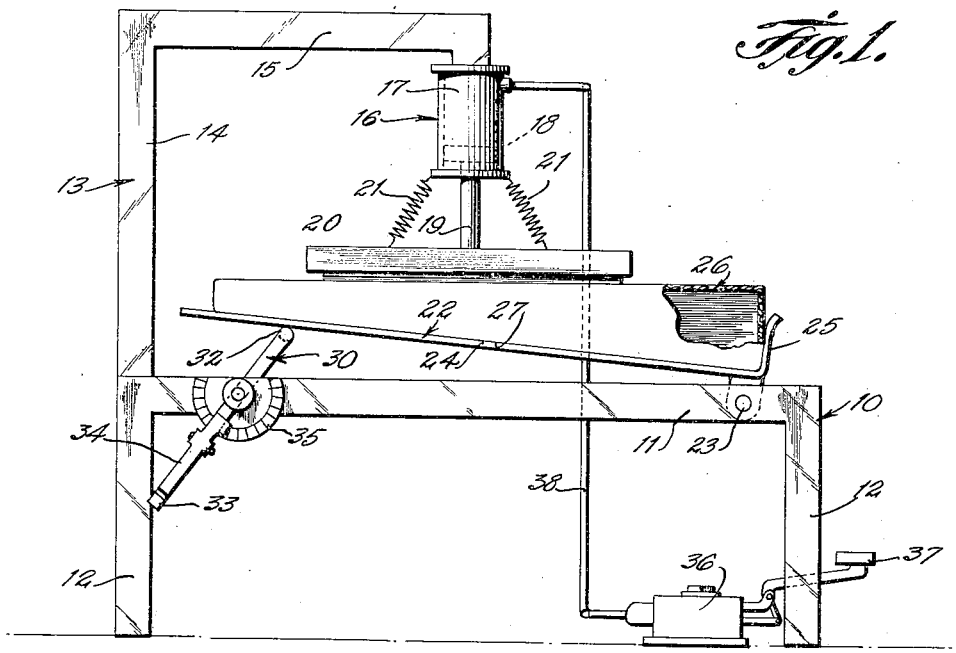
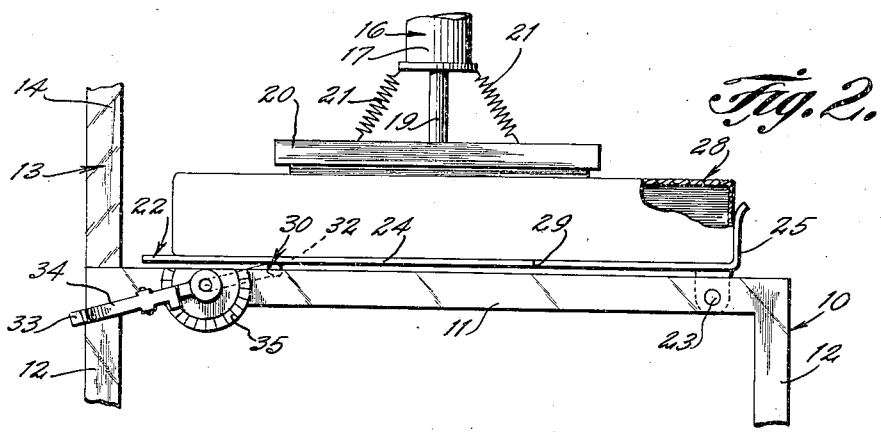
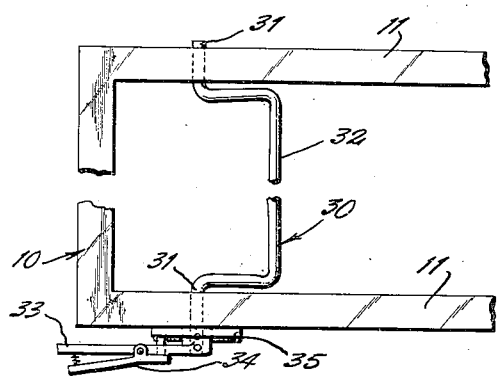
INVENTOR.
Philip J. Carolan
BY
Victor J. Evans & Co.
Attorneys

2,991,583
SEAT PRESS
Philip J. Carolan, 39 W. St. Johns Ave., Central Islip, N.Y.
Filed Dec. 8, 1958, Ser. No. 778,934
1 Claim. (Cl. 45—138)

This invention relates to a press, and more particularly to a device for compressing a member such as a seat.

The object of the invention is to provide a device which is adapted to be used for compressing a seat such as an automobile seat, as for example when a seat cover is to be arranged on or removed from the seat, or when upholstery work is to be performed on such a seat.

Another object of the invention is to provide a seat press which will accommodate seats having flat bottoms or inclined bottoms, and wherein a means is provided for readily applying pressure to the seat or releasing pressure therefrom.

A further object of the invention is to provide a seat press which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is an elevational view of the seat press, constructed according to the present invention, and showing a seat with an inclined bottom being handled.

FIGURE 2 is a view similar to FIGURE 1, but showing a seat with a flat bottom being handled.

FIGURE 3 is a fragmentary plan view illustrating certain constructional details of the device.

Referring in detail to the drawings, the seat press of the present invention is shown to comprise a frame which is indicated generally by the numeral 10, and the frame 10 includes a pair of horizontally disposed spaced parallel beams 11 as well as vertically disposed supporting legs 12. There is further provided a support member which has a substantially L-shape, and the support member is indicated generally by the numeral 13 and includes a vertical portion 14 and a horizontal portion 15. The numeral 16 indicates a jack which is supported by the support member 13, and the jack 16 includes a stationary cylinder 17. A piston 18 is movably mounted in the cylinder 17, and a movable piston rod 19 is connected to the piston 18. The numeral 20 indicates a movable base which is connected to the lower end of the rod 19, and return springs 21 extend between the base 20 and cylinder 17.

The apparatus of the present invention further includes a pivotally mounted plate which is indicated generally by the numeral 22, and the plate 22 has one end pivotally connected to the beams 11 as at 23. The plate 22 includes a main flat portion 24 and an upturned end portion 25. In FIGURE 1 the numeral 26 indicates a seat such as an automobile seat which is being compressed in the present invention, and the seat 26 may be of a type which includes a beveled or inclined bottom 27. Or, as shown in FIGURE 2 a seat 28 having a flat bottom 29 may be accommodated or handled in the device.

A means is provided for pivoting the plate 22, and this means comprises a crank which is indicated generally by the numeral 30. The crank 30 includes end portions 31 which are pivotally connected to the beams 11, FIGURE 3, and the crank 30 further includes an intermediate offset section 32 which is arranged in engagement with the bottom of the plate 22. A handle 33 is connected to an end of the crank 30 for use in rotating the crank, and the numeral 34 indicates a latch or dog which is adapted to cooperate with a ratchet or sector plate 35 whereby the crank 30 can be maintained immobile in its various adjusted positions.

There is further provided a means for actuating the jack 16, and this means comprises a pump 36 which is adapted to be operated by means of a foot pedal 37, and a conduit 38 extends between the pump 36 and the cylinder 17 of the jack 16.

From the foregoing, it is apparent that there has been provided a seat press which is especially suitable for use by persons who are applying seat covers to seats or who are working on upholstery or the like. In use the seat such as the seat 26 is adapted to be arranged as shown in FIGURE 1 so that it is supported on the plate 22, and the upturned end 25 of the plate 22 helps maintain the seat 26 on the plate 22. The user can then manually move the latch 34 so as to free the latch from the ratchet 35 whereby the handle 33 can be used to pivot the crank 30. As the crank 30 is pivoted, the plate 22 will be pivoted on its pin 23 since the portion 32 of the crank 30 engages the lower surface of the plate 22. Thus, the plate 22 can be brought up against a bottom surface such as the inclined bottom surface 27 of the seat 26, or the plate 22 can be arranged as shown in FIGURE 2 where a seat 28 having a flat bottom 29 is being handled.

It is to be noted that with a seat such as the seat 26 or the seat 28 resting on the plate 22, the pump 36 can be actuated by operating the pedal 37 so that the actuating medium which may be a hydraulic fluid under pressure will be forced through the conduit 38 and into the upper end of the cylinder 17. This will cause the piston 18 to move downwardly in the cylinder 17 so that the rod 19 will move downwardly and thus carry or move the base 20 downwardly so that the seat will be compressed between the base 20 and the plate 22. With the seat thus compressed, the seat cover can be more easily arranged over the seat or such a seat cover can be removed when desired. Or, with the seat under pressure, various types of upholstery work can be more easily performed. After the work on the seat has been completed, a suitable release mechanism can be actuated so as to release the pressure of the fluid in the cylinder 17 whereby the springs 21 will return the base 20 to its raised position so that the seat such as the seat 26 or the seat 28 can be readily removed from the machine. Then, such seat can be positioned in an automobile or other device where the seat is to be used.

The parts can be made of any suitable material and in different shapes or sizes.

Various structural changes can be made wherever desired or required, as for example braces can be added where needed. The apparatus utilizes a minimum number of parts so that the machine is inexpensive to make and if desired the machine can be mounted on casters or wheels so that it can be conveniently moved from place to place as desired. The machine is especially suitable for use by persons such as upholsterers and automobile dealers or the like.

It will therefore be seen that there has been provided a seat press which is especially suitable for compressing an automobile seat and holding such a seat stationary. In use, the operator works the hydraulic pump 36 until there is sufficient pressure on the seat being worked on and then the upholstery or slip cover is brought up in place and this material is tacked or clipped in place and then the pressure can be released and the seat removed. The plate 22 is hinged as at 23 so that the plate can be moved up and down to handle flat seats or beveled seats. The machine can also be used by slip cover dealers who install slip covers or seat covers in vehicles. The machine will be economical to use since it will result in a saving of manpower, time and energy.

Minor changes in shape, size and rearrangement of details coming within the field of invention claimed may be resorted to in actual practice, if desired.

I claim:

In a device of the character described, a frame including horizontally disposed spaced parallel beams, vertically disposed legs depending from said beams, an L-shaped support member extending above said beams, a jack supported by said support member and including a cylinder, a movable piston rod depending from said cylinder, a movable base connected to the lower end of said rod, a plate having one end hingedly connected to said beams, said plate including a main flat portion and an upturned end portion, means for causing pivotal movement of said plate, said means comprising a crank having end portions rotatably connected to said beams, said crank further including an intermediate offset section engaging the bottom of the plate for pivotal movement of said plate, a handle connected to an end of the crank, a latch mechanism for retaining the crank immobile in its adjusted positions, coil springs extending between said cylinder and base, and means for actuating the jack, said means comprising a foot operated pump, and a conduit connecting said pump to said cylinder.

References Cited in the file of this patent

UNITED STATES PATENTS

| | | |
|---|---|---|
| 347,536 | Veilleux et al. | Aug. 17, 1886 |
| 1,493,891 | Moore | May 13, 1924 |
| 1,546,689 | Verwys | July 21, 1925 |
| 1,801,029 | Vandervoort | Apr. 14, 1931 |